United States Patent
Salter et al.

(10) Patent No.: US 10,457,196 B1
(45) Date of Patent: Oct. 29, 2019

(54) VEHICLE LIGHT ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Lori Ross, Royal Oak, MI (US); Adam Bangerter, Dearborn, MI (US); Sejal Shreffler, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/950,590

(22) Filed: Apr. 11, 2018

(51) Int. Cl.
| | |
|---|---|
| *B60Q 1/24* | (2006.01) |
| *F21V 23/00* | (2015.01) |
| *F21V 9/30* | (2018.01) |
| *F21V 23/04* | (2006.01) |
| *F21W 107/10* | (2018.01) |
| *F21W 102/17* | (2018.01) |

(52) U.S. Cl.
CPC .............. *B60Q 1/24* (2013.01); *F21V 9/30* (2018.02); *F21V 23/003* (2013.01); *F21V 23/0471* (2013.01); *F21W 2102/17* (2018.01); *F21W 2107/10* (2018.01)

(58) Field of Classification Search
CPC ... B60Q 1/24; B60Q 1/26; B60Q 1/44; B60Q 33/82; B60Q 33/217
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Anne M Hines
(74) *Attorney, Agent, or Firm* — Vichit Chea; Price Heneveld LLP

(57) ABSTRACT

A vehicle light assembly is provided herein. The light assembly includes a housing operably coupled with a bumper. First and second light sources are disposed within the housing. A first optic is optically coupled with the first and second light sources. The first light source and first optic illuminate a first illumination zone and the second light source illuminates a second illumination zone, the second illumination zone larger than the first illumination zone.

20 Claims, 5 Drawing Sheets

(56) References Cited

U.S. PATENT DOCUMENTS

| | | |
|---|---|---|
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,421,902 B2 | 8/2016 | Kowatzki |
| 9,452,709 B2 | 9/2016 | Aburto Crespo |
| 9,568,659 B2 | 2/2017 | Verger et al. |
| 9,616,812 B2 | 4/2017 | Sawayanagi |
| 9,821,743 B2 | 11/2017 | Zhang et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0001700 A1* | 1/2016 | Salter .............. B60Q 1/56 362/510 |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0210282 A1 | 7/2017 | Rodriguez Barros |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102004050600 A1 | 4/2006 |
| DE | 102015118167 A1 | 4/2016 |
| EP | 1793261 A1 | 6/2007 |
| EP | 2778209 A1 | 9/2014 |
| GB | 2517789 A | 3/2015 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE LIGHT ASSEMBLY

FIELD OF THE INVENTION

The present disclosure generally relates to vehicle lighting assemblies, and more particularly, to vehicle lighting assemblies that may be disposed within a vehicle bumper.

BACKGROUND OF THE INVENTION

Vehicle lighting applications continue to grow in popularity. Accordingly, a light assembly that may be integrated into a vehicle bumper is provided herein that is operable to provide functional lighting as well as impart a stylistic element to the vehicle.

SUMMARY OF THE INVENTION

According to one aspect of the present disclosure, a vehicle light assembly is provided herein. The vehicle light assembly includes a housing operably coupled with a bumper. First and second light sources are disposed within the housing. A first optic is optically coupled with the first light source. The first light source and first optic illuminate a first illumination zone and the second light source illuminates a second illumination zone. The second illumination zone is larger than the first illumination zone.

According to another aspect of the present disclosure, a vehicle light assembly is provided herein. The vehicle light assembly includes a plurality of light sources disposed within a housing; wherein the housing configured to be positioned below a door. Optics are operably coupled with the plurality of light sources. The plurality of light sources in conjunction with the optics form a first illumination zone.

According to yet another aspect of the present disclosure, a vehicle light assembly is provided herein. The vehicle light assembly includes a housing operably coupled with a bumper. First and second light sources are disposed within the housing and forming respective first and second illumination zones. Optics are optically coupled with the first and second light sources. The housing is positioned proximate a rear door and a first illumination zone defines a rotational space for uninhibited movement of the door between a closed and an open position and a second illumination zone is larger than the first illumination zone.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
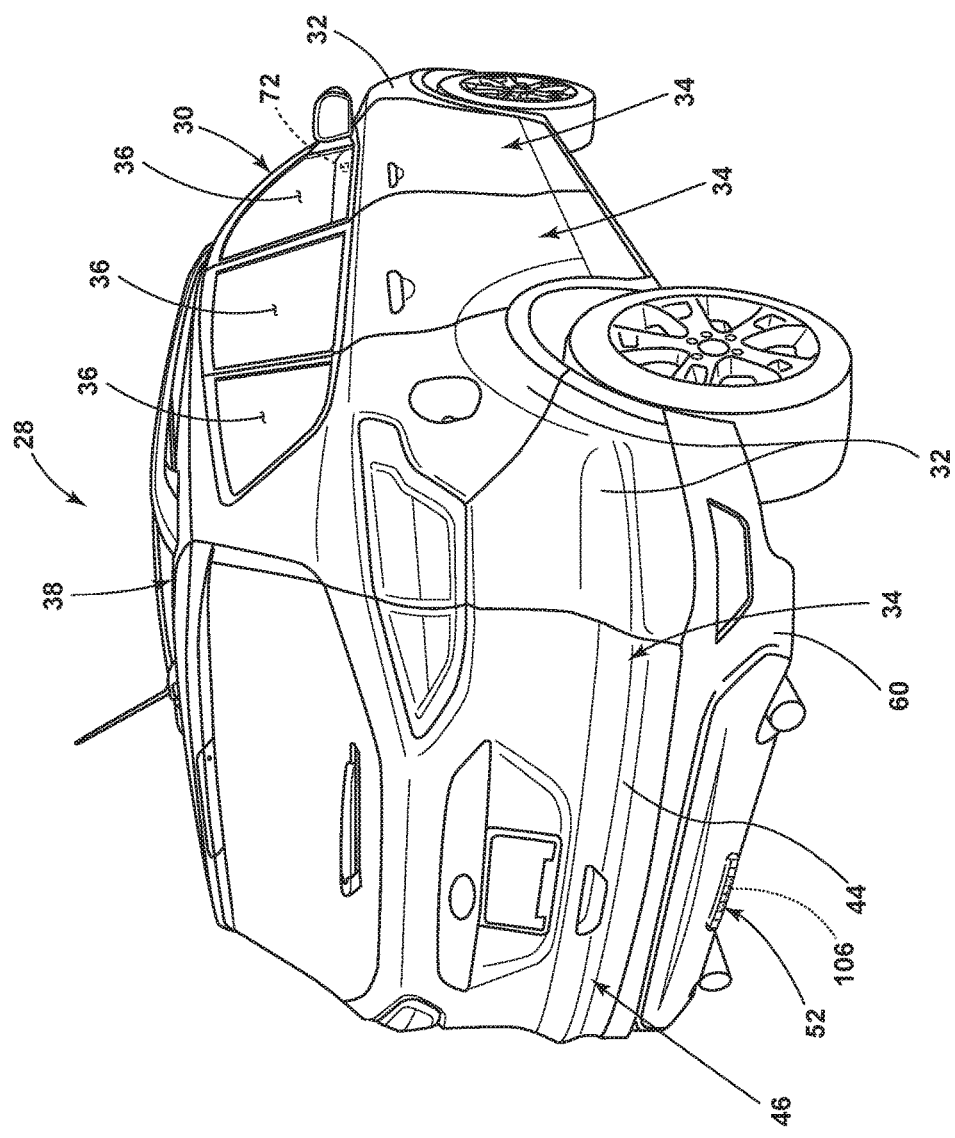
FIG. 2 is a rear perspective view of a vehicle with a rear door in a closed position and a light assembly disposed below the rear door, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light assembly that may be integrated into a bumper. In some examples, the vehicle light assembly includes a housing that may be operably coupled with the bumper. First and second light sources may be disposed within the housing. Optics may be optically coupled with the first and/or second light sources. The first light source and a first optic may illuminate a first illumination zone and the second light source may illuminate a second illumination zone. The second illumination zone may be larger than the first illumination zone. In some examples, the first illumination zone defines a rotational space for uninhibited movement of a door between a closed and an open position. The first or second light source may be operably coupled with phosphorescent and/or luminescent structures to luminesce in response to predefined events. The luminescent structures may be configured to convert emitted light received from an associated light source and re-emit the light at a different wavelength generally found in the visible spectrum.

Figure 1A:
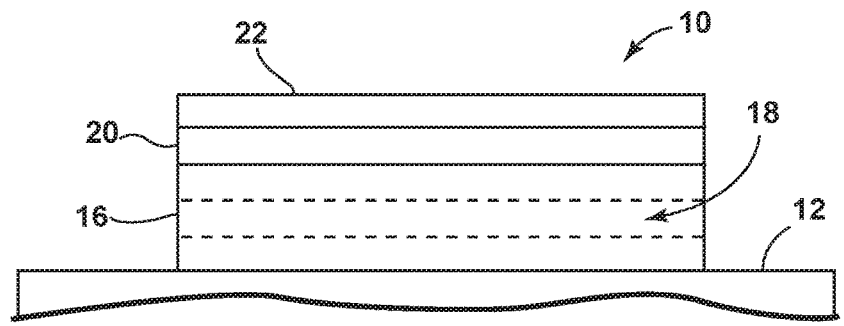
FIG. 1A is a side view of a luminescent structure rendered as a coating, according to some examples.
Figure 1B:
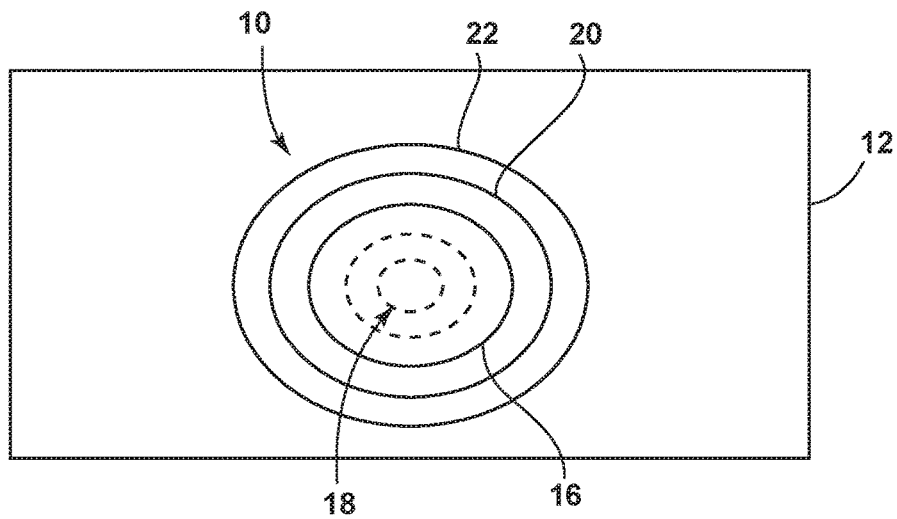
FIG. 1B is a top view of a luminescent structure rendered as a discrete particle, according to some examples.
Figure 1C:
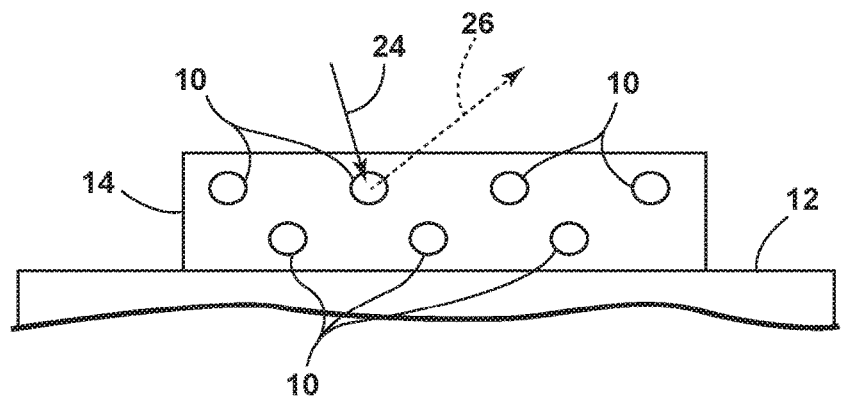
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

Figure 5:
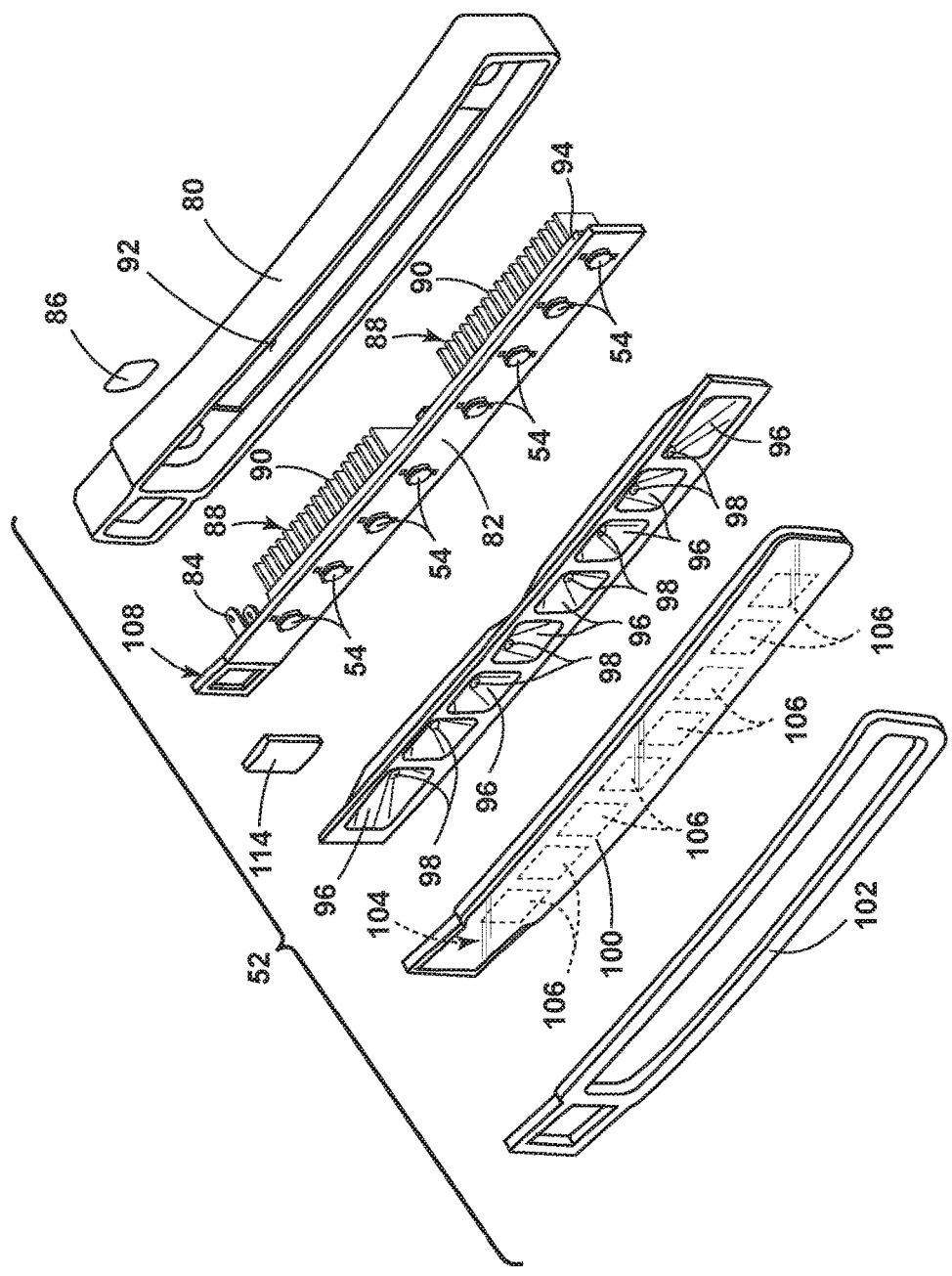
FIG. 5 is a front exploded view of the light assembly, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from light source 54 (FIG. 5). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light source 54). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 54 that emit the emitted light 24, including, but not limited to, natural light source (e.g., the sun) and/or any artificial light source 54. The periodic absorption of the emitted light 24 from any excitation source may provide for a substantially sustained charge of the long-persistence luminescent material 18 to provide for consistent passive illumination. In various examples, a light sensor 72 (FIG. 2) may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 3:
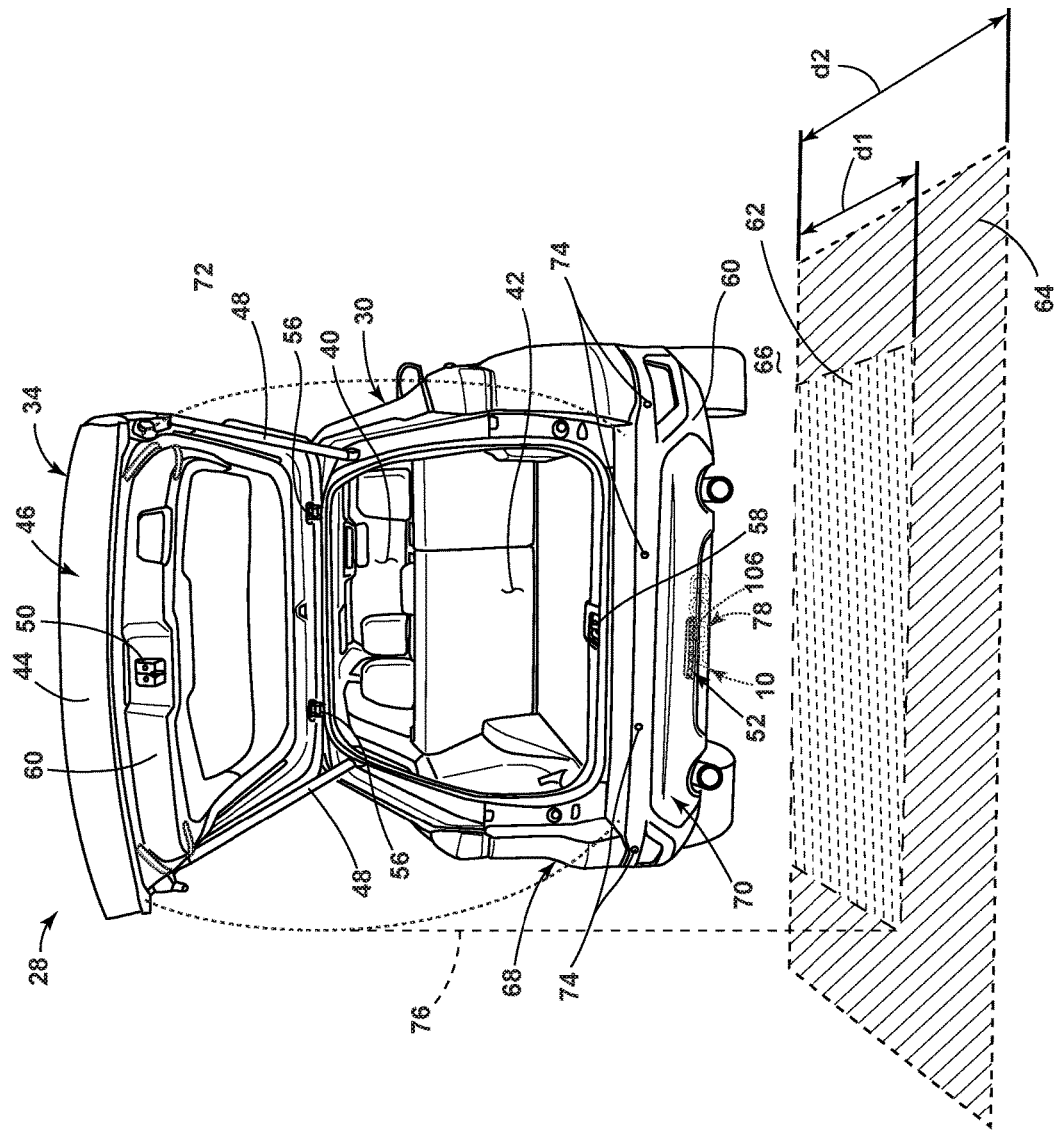
FIG. 3 is a rear perspective view of the vehicle with the rear door in an open position and the light assembly illuminating a ground surface proximate the rear door, according to some examples.

With reference to FIGS. 2 and 3, a vehicle 28 generally includes a body 30, a chassis, and a powertrain driving road wheels to move the vehicle 28. The body 30 generally includes one or more body panels 32, doors 34, windows 36, and a roof 38 that generally define a passenger compartment 40 of the vehicle 28. One or more of the doors 34 may provide access to the passenger compartment 40 and/or a cargo compartment 42. For example, the cargo compartment 42 may be accessible through a rear door 44, which may be configured as a hatch 46. The rear door 44 is movably attached to one or more of the proximately disposed body panels 32 of the vehicle 28 such that the rear door 44 can be moved from a closed position (FIG. 2) to an open position (FIG. 3). It will be appreciated that the open position may be any position that is different from the closed position without departing from the scope of the present disclosure. Accordingly, the rear door 44 may be disposed in a plurality of open positions, including a wide array of intermediate open positions and a fully open position.

In some examples, gas springs 48 may assist in movement of the rear door 44 when a latch 50 is released. As will be described in greater detail below, a light assembly 52 may be used in conjunction with the rear door 44 to provide illumination proximately thereto through one or more light sources 54 (FIG. 5). It will be appreciated that any closure member disposed on the vehicle 28, including, but not limited to, a door 34, a trunk lid, a hatch 46, a tailgate, a lift gate, a hood, a gas cap, etc. may be used in conjunction with the light assembly 52 set forth herein without departing from the spirit of the present disclosure.

Referring to FIGS. 2 and 3, the hatch 46 is connected to the body 30 of the vehicle 28 by one or more hinges 56. Moreover, the hatch 46 may be selectively retained in a closed position by a latch 50 engaging a striker 58. When moved between the closed and open positions, the door 34 may rotate about a horizontal axis, a vertical axis, and/or any other oriented axis. The light assembly 52 may be disposed below the rear door 44, and in some instances, disposed within a rear bumper 60. Further, the light assembly 52 may have a curved or non-linear orientation in some examples. In some instances, the light assembly 52 may protrude and/or extend outward from the bumper 60, or any other panel of the vehicle 28.

The light assembly 52 may have one or more light sources 54 (FIG. 5) that illuminate one or more illumination zones 62, 64 based on predefined events. For example, as illustrated in FIG. 3, the first illumination zone 62 may illuminate a ground surface 66 proximate a rear portion 68 of the vehicle 28 that extends a distance $d_1$ from the rear portion 68 of the vehicle 28. The second illumination zone 64 may extend from the rear portion 68 of the vehicle 28 to a distance $d_2$ that is rearward and/or laterally outward of the first zone along the ground surface 66. It will be appreciated that the illumination zones 62, 64 provided herein are exemplary. Accordingly, the light assembly 52 may illuminate some of the illumination zones 62, 64 described herein, all of the illumination zones 62, 64 provided herein, and/or additional illumination zones without departing from the scope of the present disclosure.

Figure 4:
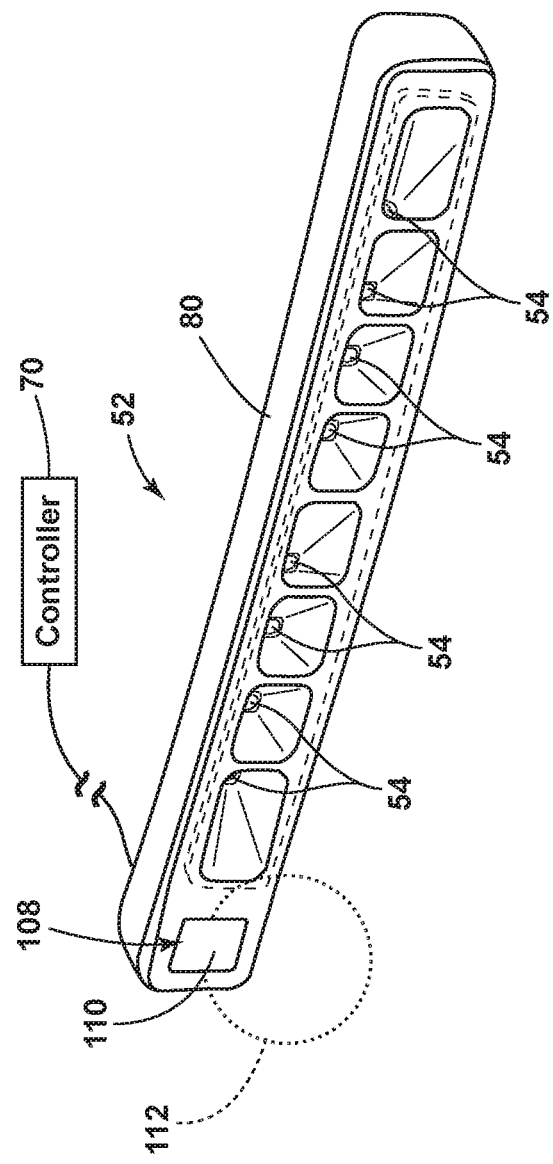
FIG. 4 is a front perspective view of the light assembly, according to some examples.

The light assembly 52 is electrically coupled with a controller 70 (FIG. 4). The controller 70 can provide the light assembly 52 with generated pulse width modulated (PWM) signals to produce the corresponding light intensity and/or light color. Alternatively, the controller 70 can directly drive the current to the light assembly 52 to accomplish the same variations in intensity and/or light color. In some examples, the vehicle 28 includes a light sensor 72 (FIG. 2) that may be utilized for varying the intensity of emitted light 24 emanated from the light assembly 52. The light sensor 72 detects ambient lighting conditions, such as whether the vehicle 28 is in day-like conditions (i.e., higher light level conditions) and/or whether the vehicle 28 is in night-like conditions (i.e., lower light level conditions). The light sensor 72 can be of any suitable type and can detect the day-like and night-like conditions in any suitable fashion. According to some examples, the colors of light and/or intensities of the emitted light 24 from the light assembly 52 may be varied based on the detected conditions. The light sensor 72 may be integrated into the vehicle 28 or into the light assembly 52.

With further reference to FIG. 3, as provided herein, the light assembly 52 may selectively illuminate the various illumination zones 62, 64. In some instances, as represented by the first illumination zone 62, the light assembly 52 may be configured to direct emitted light 24 laterally inward from the vehicle outer panels 32 in a side-to-side direction (i.e., width of the first illumination zone 62 may be less than the width of the vehicle 28) and/or vehicle rearwardly to indicate the rotational space 76 of the rear door 44 during opening thereof. As used herein, "rotational space" is the space exterior of the vehicle 28 that the door 34 may extend while moving from the closed position to the open position or vice versa. If the rotational space 76 is free of persons and/or objects, the rear door 44 may uninhibitedly move between the closed position and an open position.

According to various examples, multicolored light sources 54 may be used within the light assembly 52 such that the first illumination zone 62 may illuminate in a red color, an amber color, and/or in any other color in a steady and/or intermittent pattern. Such colors and/or illumination patterns may be used to provide additional safety and/or visibility to the vehicle 28 in conjunction with the opening and closing of a door 34, such as the rear door 44. In some examples, the first illumination zone 62 may become illuminated, possibly intermittently, for a predefined amount of time before the rear door 44 is opened. In such examples, the predetermined time may begin with the initiation of a latch signal, a switch signal, a remote signal (e.g., a key fob signal), etc.

Referring still to FIG. 3, the second illumination zone 64 may illuminate an area from the rear portion 68 of the vehicle 28 to a distance $d_2$ that is outward of the first illumination zone 62 and/or outwardly of the hatch 46. The second illumination zone 64 may be utilized when a person is disposed rearwardly of the vehicle 28, such as when a person is participating in a tailgate with the hatch 46 in the open position. When the second illumination zone 64 is illuminated, the light assembly 52 may output light in a continuous manner at a continuous and/or varied intensity. When the light assembly 52 is disposed below the door 34, a person and/or object within the first and/or second illumination zones 62, 64 may minimally affect the illumination of the ground surface 66 within the illuminated illumination zones 62, 64.

With further reference to FIG. 3, the vehicle 28 may also include one or more exterior sensors 74 that may be disposed on the bumper 60 and may generate a detection field. The one or more exterior sensors 74 may be configured as an ultrasonic sensor, a radar sensor, a LIDAR sensor, an imaging sensor, and/or any other type of sensor known in the art. The one or more exterior sensors 74 may be operably coupled with the controller 70 such that the controller 70 may activate/deactivate the light sources 54, toggle the light sources 54 between the various illumination settings (i.e., selectively illuminate the various illumination zones 62, 64), and/or provide any other desired signal to the vehicle 28.

The one or more exterior sensors 74 may be configured to detect an object within the rotational space 76 of the rear door 44 and illuminate the first illumination zone 62, and/or any other illumination zone (e.g., 64), to provide notification of the rotational space 76. In some instances, when the rear door 44 is to be moved from the closed position to the open and/or vice versa, the first illumination zone 62 may illuminate intermittently to further notify a person within the first illumination zone 62 that the rear door 44 may contact them. Once the door 34 is placed in the open position, the first and second illumination zones 62, 64 may illuminate in a common color, intensity, etc. to provide functional and/or aesthetic lighting to the vehicle 28. In some examples, the one or more exterior sensors 74 may be used to detect a person and/or an object within the first illumination zone 62 and illumination of the first illumination zone 62 may be varied based on the presence of an object. For example, if the first illumination zone 62 is free of persons and/or objects as detected by the one or more exterior sensors 74, the first and second illumination zones 62, 64 may be illuminated in a similar manner. If a person and/or object is detected within the first and/or second illumination zone 62, 64, the first illumination zone 62 may provide additional warning and/or notification to person and/or object.

Referring again to FIG. 3, in some instances, the vehicle 28 may include the luminescent structure 10 on a body feature thereof, such as the bumper 60. The light assembly 52 may be configured to direct emitted light 24 at the luminescent structure 10. In some instances, the luminescent structure 10 may be integrated within a paint and/or other decorative material that is disposed on the bumper 60. In some examples, the luminescent structure 10 may define indicia 78 that signifies a make, model, feature of the vehicle 28, and/or other desired information. In operation, the luminescent structure 10 may exhibit a constant unicolor or multicolor illumination in response to receiving emitted light 24 from the light assembly 52.

Referring to FIGS. 4 and 5, the light assembly 52, according to some examples, includes a rear housing 80 for being fastened to the bumper 60 (FIGS. 2 and 3). The rear housing 80 supports a circuit board, which may be configured as a printed circuit board (PCB) 82, oriented along the rear housing 80 and having control circuitry including drive circuitry for controlling activation and deactivation of the plurality of light sources 54. The PCB 82 may be any type of circuit board including, but not limited to, any flexible PCB and/or rigid PCB.

The PCB 82 is operably coupled with the controller 70 that is configured to receive various inputs and control the light assembly 52 by applying signals to the light sources 54 within the light assembly 52. The controller 70 may be disposed within the light assembly 52 and/or within the vehicle 28. The controller 70 may include a microprocessor and memory, according to some examples. It should be appreciated that the controller 70 may include control circuitry such as analog and/or digital control circuitry. Logic is stored within the memory and executed by the microprocessor for processing the various inputs and controlling each of the plurality of light sources 54, as described herein. The inputs to the controller 70 may include a door position signal, a sensor signal, a door unlatch signal, a switch activation signal, and/or any other signal.

The controller 70 may include any combination of software and/or processing circuitry suitable for controlling the various components of the light assembly 52 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

A power terminal 84 is provided on the PCB 82 for passing through a seal 86 for electrical connection with a corresponding receptacle within the vehicle 28. In some examples, the power terminal 84 may be surrounded by a connector shell that is molded in conjunction with any other portion of the light assembly 52, such as the rear housing 80.

With respect to the examples described herein, the light sources 54 may each be configured to emit visible and/or non-visible light, such as blue light, UV light, infrared, and/or violet light and may include any form of light source. For example, the light sources 54 may be fluorescent lights, light emitting diodes (LEDs), organic LEDs (OLEDs), polymer LEDs (PLEDs), laser diodes, quantum dot LEDs (QD-LEDs), solid-state lights, a hybrid of these or any other similar device, and/or any other form of light source. Further, various types of LEDs are suitable for use as the light source 54 including, but not limited to, top-emitting LEDs, side-emitting LEDs, and others. Moreover, according to various examples, multicolored light sources, such as Red, Green, and Blue (RGB) LEDs that employ red, green, and blue LED packaging may be used to generate various desired colors of light output from a single light source, according to known light color mixing techniques.

Referring again to FIGS. 4 and 5, the light sources 54, while producing emitted light 24, also emit heat. As heat is emitted from the light sources 54, a heatsink 88 captures at least a portion of this heat. The captured heat is temporarily retained within elongated members 90 of the heatsink 88. The captured heat within the heatsink 88 migrates to areas that have a lower temperature than the heatsink 88. As such, the heatsink 88, after absorbing heat from the light sources 54, exchanges, or transfers heat to cooler regions in and around the bumper 60. In some examples, the rear housing 80 may define a void 92 through which the heatsink 88 may extend. Accordingly, the heatsink 88 may dissipate heat into a space disposed vehicle forward of an outer surface of the rear bumper 60 of the vehicle 28 to increase the efficiency of the heatsink 88.

In various examples, the elongated members 90 of the heatsink 88 can extend generally perpendicular to a back portion 94 of the heatsink 88. In such an example, the elongated members 90 can be linear or can include various angled and/or curved portions. It is contemplated that, in various instances, the elongated members 90 can extend in an angled configuration or a curved configuration, or both, relative to the back portion 94 of the heatsink 88. It is further contemplated that each elongated member 90 can have configurations that can include, but are not limited to, linear, curved, angled, and trapezoidal, among other configurations. Additionally, various cross members can be included that extend across the elongated members 90 to add structure to the elongated members 90 and also add surface area through which heat can be transferred from the light assembly 52. It is also contemplated that the elongated members 90 may not have a consistent length. Such configurations may include a triangular profile, a trapezoidal profile, a curved profile, an irregular profile, among other similarly shaped profiles. Various examples of the heatsink 88 may also include more than one row of elongated members 90, such as an inner layer and outer layer of elongated members 90. In the various examples, the heatsink 88 can be made of various materials that have a high thermal conductivity. Such materials can include but are not limited to, aluminum, aluminum alloys, copper, composite materials that incorporate materials having a high thermal conductivity, combinations thereof, and other materials that are at least partially thermally conductive.

With further reference to FIGS. 4 and 5, a plurality of reflectors 96 is provided within the light assembly 52. The reflectors 96 may be formed integrally as depicted and each includes an aperture 98 aligned with the corresponding light source 54. The reflectors 96 are utilized for reflecting and redirecting emitted light 24 from the light sources 54 for focusing the illumination to one or more illumination zones 62, 64. The reflectors 96 and corresponding light sources 54 are oriented to convey light forward, laterally outward, downward, and/or rearward of the bumper 60 for illuminating the illumination zones 62, 64.

A translucent lens cover 100 and a gasket 102 are also provided in the light assembly 52 for isolating various components of the light assembly 52 from external contaminants and weather. In some instances, the lens cover 100 and/or the gasket 102 may include a decorative layer 104 thereon. The decorative layer 104 is configured to control or modify an appearance of the light assembly 52. In various examples, the decorative layer 104 may confer a plurality of various patterns, textures, colors, etc. to various portions of the light assembly 52. The decorative layer 104 can be disposed on an interior and/or an exterior surface of the lens cover 100 through any method known in the art, including, but not limited to, sputter deposition, vacuum deposition (vacuum evaporation coating), electroplating, and/or printing onto the film. The decorative layer 104 may be chosen from a wide range of materials and/or colors, including, but not limited to, silver, chrome, copper, bronze, gold, or any other colored surface. Additionally, an imitator of any metallic material may also be utilized without departing from the teachings provided herein. In various examples, the decorative layer 104 may have a textured or grained surface. The grained surface may be produced on various portions of the lens cover 100 and/or the gasket 102 to have a varied or common appearance with proximately disposed components of the vehicle 28. According to some examples, the grain pattern may be produced by laser etching, or any other method known in the art. In some examples, indicia 78 may be disposed and/or integrally formed with the lens cover 100 and/or the decorative layer 104.

The lens cover 100 may include optics 106 thereon and/or the optics 106 may be otherwise operably coupled with the light sources 54. For example, the lens cover 100 may be configured with a Fresnel lens, a pillow optic, and/or any other type of lens or optic that is configured to disperse, concentrate, and/or otherwise direct light emitted from the light assembly 52 there-through in any desired manner. The optics 106 may assist in directing emitted light 24 in a desired direction to form the various illumination zones 62, 64. For example, the optics 106 may form the first illumination zone 62 in a square, rectangle, and/or any other geometric shape. In some instances, the optics 106 may be utilized to form a first illumination zone 62, or any other illumination zone 64, having a shape that corresponds to a door 34 of the vehicle 28. For example, the first illumination zone 62 may have an outline that is similar to the periphery of the rear door 44. Accordingly, the first illumination zone 62 may have a rectangular shape including rounded corners. It will be appreciated that the light assembly 52 provided herein may be disposed on any portion of the vehicle 28. It will also be appreciated that any of the illumination zones 62, 64 may have any geometric shape that may or may not correspond to the geometric shape of a door 34 proximate the light assembly 52 and/or the rotational space 76 needed for uninhibited movement of the door 34 between the closed and the open position.

With further reference to FIGS. 4 and 5, in some instances, a switch assembly 108 may be disposed within the light assembly 52, which may be configured as an integrated proximity switch 110. The proximity switch 110 provides a sense activation field 112 to sense contact or close proximity of an object, such as a person in relation to the proximity switch 110. It will be appreciated by those skilled in the art that any type of proximity switch 110 can be used, such as, but not limited to, capacitive sensors, inductive sensors, optical sensors, temperature sensors, resistive sensors, the like, or a combination thereof. The proximity switch may be used to detect a person and/or object proximate the light assembly 52 and alter the illumination sequence of the light assembly 52 based on whether a person and/or object is detected. Moreover, the switch assembly 108 may activate/deactivate the light sources 54, toggle the light sources 54 between the various illumination settings (i.e., selectively illuminate the various illumination zones 62, 64), move the hatch 46 between open and closed positions, and/or activate/deactivate any other feature of the vehicle 28. Moreover, it will be appreciated that some examples of the light assembly 52 may be free of a switch assembly 108 without departing from the teachings of the present disclosure.

An adhesive layer 114 may be disposed between the lens cover 100 and the switch assembly 108. In some examples, the adhesive layer 114 fills a space between the lens and the switch assembly 108 to assist in removing air gaps between the circuit board and the lens to minimize any sensitivity variations in production of the lens assembly and the proximity switch 110. Further, in some instances, the adhesive layer 114 may be an optically clear adhesive. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In one embodiment, the adhesive has about 10% haze or less, particularly about 5% haze or less, and more particularly about 2% haze or less. It will be appreciated that the adhesive layer 114 disposed on the PCB 82 and the lens may be of any practicable material without departing from the scope of the present disclosure.

A variety of advantages may be derived from the use of the present disclosure. For example, use of the disclosed light assembly provides notifications to a user of the vehicle and/or a unique aesthetic appearance to the vehicle. Moreover, the light assembly may provide lighting proximate the vehicle when a door or panel of the vehicle is disposed in an open position. The light assembly may be disposed below the door or panel so that an illumination zone produced by the light assembly is minimally affected by a person or object proximate the vehicle. Moreover, the illumination zone may continue to be illuminated with the door or panel in the open and closed positions. The light assembly may be manufactured at low costs when compared to standard vehicle lighting assemblies.

According to various examples, a vehicle light assembly is provided herein. The vehicle light assembly includes a housing operably coupled with a bumper. First and second light sources are disposed within the housing. A first optic is optically coupled with the first light source. The first light source and first optic illuminate a first illumination zone and the second light source illuminates a second illumination zone. The second illumination zone is larger than the first illumination zone. Examples of the vehicle light assembly can include any one or a combination of the following features:

- the housing extends vehicle rearward of the bumper;
- a first reflector operably coupled with the first light source and a second reflector operably coupled with the second light source;
- a controller operably coupled with the first and second light sources, the controller configured to selectively activate the first and second light sources;
- the controller is operably coupled with one or more exterior sensors, wherein the first and second light sources are selectively activated based on the detection of an object or person;
- the housing includes a non-linear outer surface;
- a switch assembly disposed on a circuit board within the housing and configured to selectively activate the first or the second light source;
- the housing is positioned proximate a rear door and the first illumination zone defines a rotational space for uninhibited movement of the door between a closed and an open position;
- a lens cover operably coupled with the first and second optics;
- a decorative layer disposed on the lens cover;
- the first illumination zone has a width that is less than the width of a vehicle employing the light assembly; and/or
- a luminescent structure disposed on a portion of the bumper and configured to luminesce in response to light emitted from the first or second light source.

Moreover, a method of manufacturing a vehicle light assembly is provided herein. The method includes operably coupling a housing with a bumper. The method also includes disposing first and second light sources within the housing. The method further includes aligning a circuit board along the panel that defines an opening. Lastly, the method includes optically coupling a first optic with the first light source, wherein the first light source and first optic illuminate a first illumination zone and the second light source illuminates a second illumination zone, the second illumination zone larger than the first illumination zone.

According to some examples, a vehicle light assembly is provided herein. The vehicle light assembly includes a plurality of light sources disposed within a housing; wherein the housing configured to be positioned below a door. Optics are operably coupled with the plurality of light sources. The plurality of light sources in conjunction with the optics form a first illumination zone. Examples of the vehicle light assembly can include any one or a combination of the following features:

- the plurality of light sources also forms a second illumination zone, the second illumination zone extending further from the housing that the first illumination zone;
- the plurality of light sources also forms a second illumination zone, the second illumination zone having a width that is larger than the first illumination zone; and/or
- a width of the first illumination zone is less than a width of a vehicle employing said light assembly.

According to other examples, a vehicle light assembly is provided herein. The vehicle light assembly includes a housing operably coupled with a bumper. First and second light sources are disposed within the housing and forming respective first and second illumination zones. Optics are optically coupled with the first and second light sources. The housing is positioned proximate a rear door and a first illumination zone defines a rotational space for uninhibited movement of the door between a closed and an open position and a second illumination zone is larger than the first illumination zone. Examples of the vehicle light assembly can include any one or a combination of the following features:

- a controller is operably coupled with the first and second light sources and an exterior sensor is operably coupled with the controller;
- wherein the controller intermittently illuminates the first light source prior to the opening of the door when an object or person is detected within the rotational space; and/or
- the optics are disposed within a lens cover, the lens cover operably coupled with the housing.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor and/or switch examples discussed above might include computer hardware, software, firmware, or any combination thereof to perform at least a portion of their functions. For example, a sensor and/or switch may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle light assembly comprising:
a housing disposed within a bumper;
first and second light sources disposed within the housing; and
a first optic optically coupled with the first light source, wherein the first light source and first optic illuminate a first illumination zone and the second light source illuminates a second illumination zone, the second illumination zone larger than the first illumination zone.

2. The vehicle light assembly of claim 1, wherein the housing extends vehicle rearward of the bumper.

3. The vehicle light assembly of claim 2, further comprising:
a first reflector operably coupled with the first light source and a second reflector operably coupled with the second light source.

4. The vehicle light assembly of claim 3, further comprising:
a controller operably coupled with the first and second light sources, the controller configured to selectively activate the first and second light sources.

5. The vehicle light assembly of claim 4, wherein the controller is operably coupled with one or more exterior sensors, wherein the first and second light sources are selectively activated based on the detection of an object or person.

6. The vehicle light assembly of claim 1, wherein the housing includes a non-linear outer surface.

7. The vehicle light assembly of claim 1, further comprising:
a switch assembly disposed on a circuit board within the housing and configured to selectively activate the first or the second light source.

8. The vehicle light assembly of claim 1, wherein the housing is positioned proximate a rear door and the first illumination zone defines a rotational space for uninhibited movement of the door between a closed and an open position.

9. The vehicle light assembly of claim 1, further comprising:

a lens cover operably coupled with the first and second optics.

10. The vehicle light assembly of claim 9, further comprising:
a decorative layer disposed on the lens cover.

11. The vehicle light assembly of claim 1, wherein the first illumination zone has a width that is less than the width of a vehicle employing the light assembly.

12. The vehicle light assembly of claim 1, further comprising:
a luminescent structure disposed on a portion of the bumper and configured to luminesce in response to light emitted from the first or second light source.

13. A vehicle light assembly comprising:
a housing directly coupled to a bumper;
a plurality of light sources disposed within the housing, wherein the housing configured to be positioned below a door; and
optics operably coupled with the plurality of light sources, wherein the plurality of light sources in conjunction with the optics form a first illumination zone.

14. The vehicle light assembly of claim 13, wherein the plurality of light sources also forms a second illumination zone, the second illumination zone extending further from the housing that the first illumination zone.

15. The vehicle light assembly of claim 13, wherein the plurality of light sources also forms a second illumination zone, the second illumination zone having a width that is larger than the first illumination zone.

16. The vehicle light assembly of claim 13, wherein a width of the first illumination zone is less than a width of a vehicle employing said light assembly.

17. A vehicle light assembly comprising:
a housing fastened to a bumper;
first and second light sources disposed within the housing and forming respective first and second illumination zones; and
optics optically coupled with the first and second light sources, wherein the housing is positioned proximate a rear door and a first illumination zone defines a rotational space for uninhibited movement of the door between a closed and an open position and a second illumination zone is larger than the first illumination zone.

18. The vehicle light assembly of claim 17, further comprising:
a controller is operably coupled with the first and second light sources and an exterior sensor is operably coupled with the controller.

19. The vehicle light assembly of claim 18, wherein the controller intermittently illuminates the first light source prior to the opening of the door when an object or person is detected within the rotational space.

20. The vehicle light assembly of claim 17, wherein the optics are disposed within a lens cover, the lens cover operably coupled with the housing.

* * * * *